May 18, 1937.　　　　J. H. HUNT　　　　2,080,484
AUTO COASTING DEVICE
Filed May 25, 1931　　　3 Sheets-Sheet 1

Inventor
John H. Hunt

May 18, 1937.  J. H. HUNT  2,080,484
AUTO COASTING DEVICE
Filed May 25, 1931  3 Sheets-Sheet 2

Inventor
John H. Hunt
By Blackmore, Spencer & Hunt
Attorneys

May 18, 1937.  J. H. HUNT  2,080,484
AUTO COASTING DEVICE
Filed May 25, 1931   3 Sheets-Sheet 3

Inventor
John H. Hunt

By Blackmore, Spencer & Flick
Attorneys

Patented May 18, 1937

2,080,484

UNITED STATES PATENT OFFICE 2,080,484

AUTO COASTING DEVICE

John H. Hunt, Detroit, Mich., assignor, by mesne assignments, to General Motors Corporation, Detroit, Mich., a corporation of Delaware Application May 25, 1931, Serial No. 539,773

9 Claims. (Cl. 192—.01)

This invention relates to motor vehicles. More particularly it relates to control mechanism for motor vehicles wherein power-operated means is used to release the clutch.

The primary object is to improve the operation of such a power-operated clutch releasing device. A further and more specific object is to improve the action of clutch reengagement.

Other objects and advantages will be understood from the following specification.

The invention will be described with reference to the accompanying drawings which show several illustrative embodiments.

In the drawings—

It is already well-known to operate the engine clutch by power derived from some moving part of the vehicle, compressed air, vacuum, circulating fluids or mechanical connections properly arranged having been used. These power devices for clutch operation have sometimes been controlled by levers or pedals having no other function. They have also been controlled by interlinking with other controls on the car, such as the gear shift lever or the accelerator pedal. In the latter case clutch engagement and disengagement may occur automatically at the same time the gear shift lever or the accelerator pedal is moved by the driver. Where the power device is operated automatically, clutch reengagement may occur when there is a large difference in speed between the engine flywheel and the clutch plates, and engagement under such circumstances can cause undesirable accelerations or decelerations of the vehicle. Thus the clutch power-operating device can be so connected that the clutch is disengaged when the accelerator is in its retracted position. If the driver closes the throttle at high speed, the engine soon slows down to the idling speed. If the accelerator is then pushed down to speed up the vehicle the clutch may reengage before the engine speed has increased again to car speed. The engagement causes the engine to act momentarily as a brake which is contrary to the desire of the operator who has depressed the accelerator to cause the engine to accelerate the vehicle.

The present invention provides means to prevent clutch reengagement when the engine speed is less than the clutch shaft speed, preventing the engine from acting as a brake except as desired by the operator. The means for controlling clutch engagement involves devices for creating a fluid pressure whenever the clutch shaft and engine shaft rotate at different speeds, the arrangement being such that the fluid pressure with respect to some reference pressure which may be the pressure of the atmosphere, is higher than the reference pressure when the clutch shaft is turning faster than the flywheel, and the fluid pressure is less than the reference pressure when the engine speed is greater than the clutch shaft speed.

Figure 1:
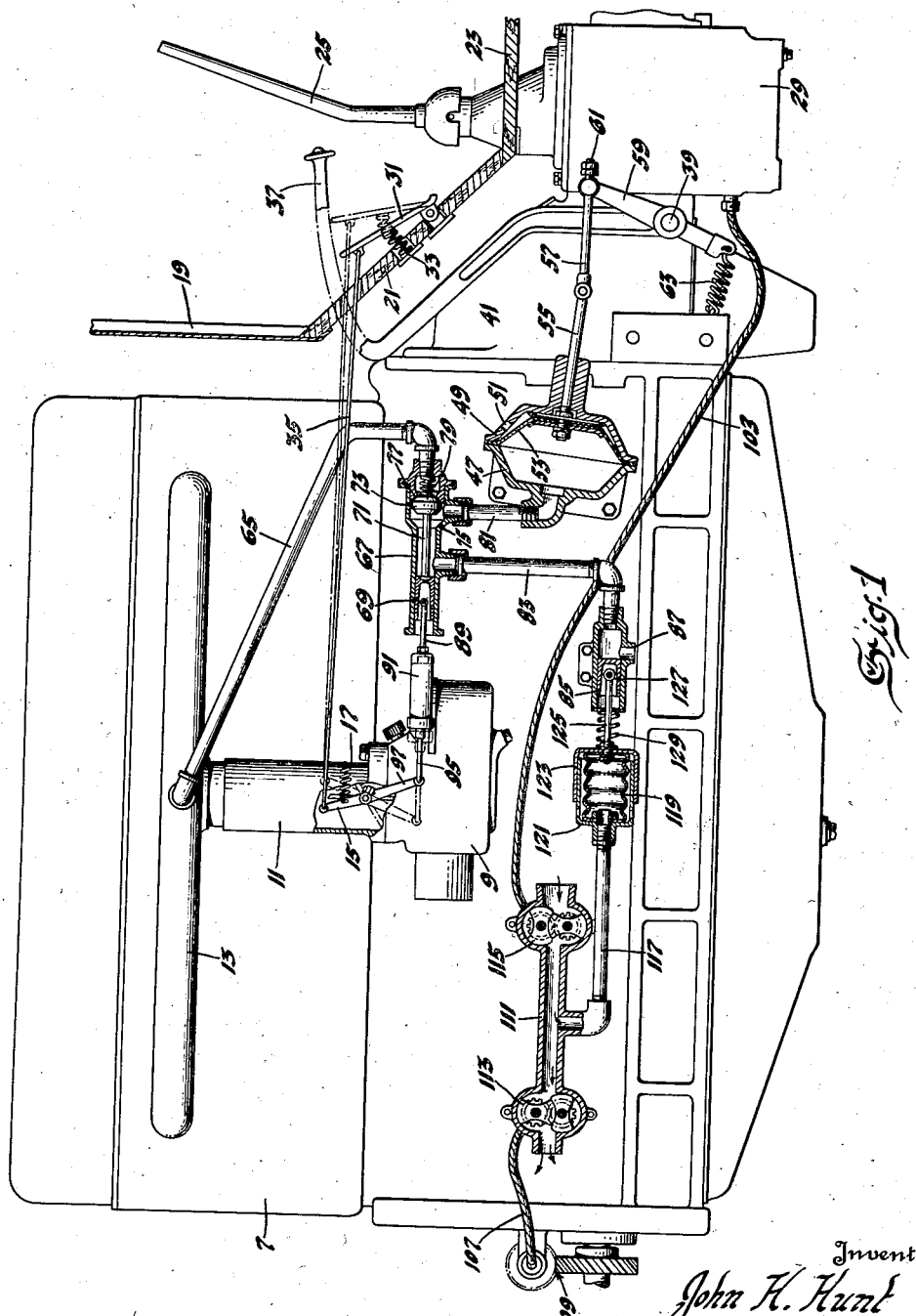
Fig. 1 is a view of an engine of a motor vehicle, the novel details associated therewith being shown partly in section.

Fig. 1 shows one form which the invention may take. Referring to Fig. 1, numeral 7 represents the engine of a motor vehicle. The engine is shown as provided with a carburetor 9 and an induction pipe 11 communicating with an intake manifold 13. At 15 is a lever pivoted to the induction pipe, the lever operating to rotate a throttle valve within the induction pipe. The spring 17 functions to hold the throttle valve in a normally closed or engine idling position.

Figure 3:
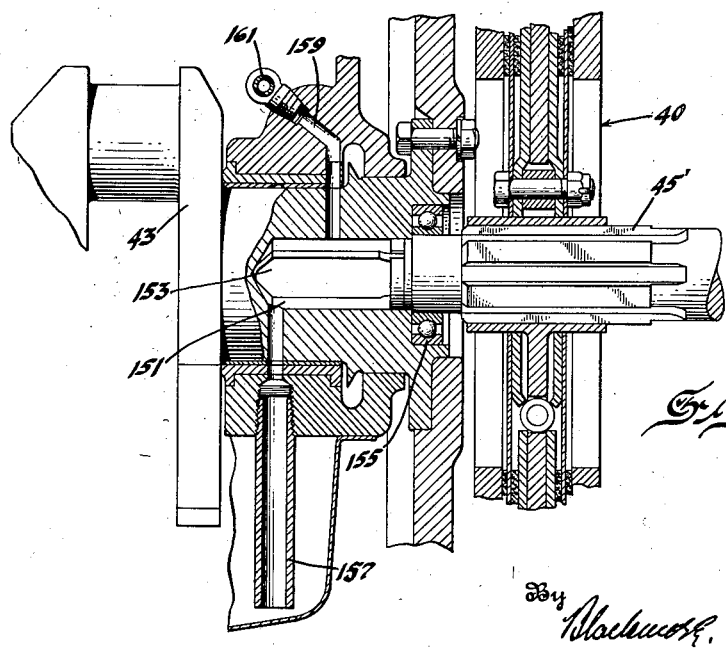
Fig. 3 is a view in section of a still further modified embodiment.
Figure 4:
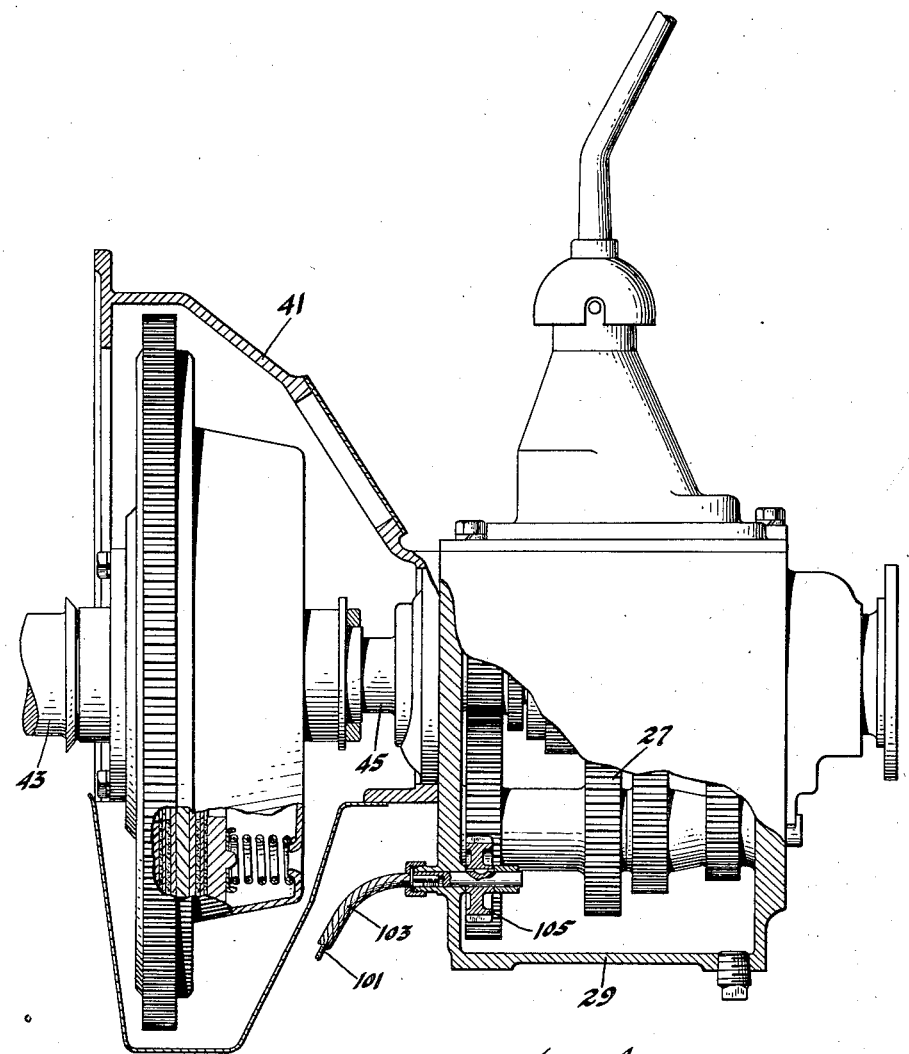
Fig. 4 is a vertical section of a power take-off device used with the several embodiments.
Figure 5:
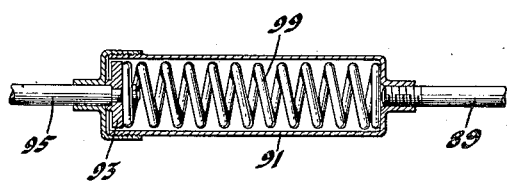
Fig. 5 is a view in longitudinal section in detail.

The position of the engine in its relation to the car is made clear by Fig. 1 which shows the dash 19, the toe board at 21, and the floor board at 23. The gear shift lever 25 operates as usual to shift gears shown in part by numeral 27 located in transmission housing 29. Pivoted to the toe board 21 is an accelerator pedal 31 which is actuated to its release position by a spring 33. A tie-rod 35 connects the pedal 31 to the throttle lever 15. At 37 is the conventional clutch pedal pivoted at 39. This pedal operates to release the clutch 40 which is shown in Fig. 3. This clutch is located within the clutch housing 41 and is rendered operative by a spring as shown by Fig. 4. The clutch couples the engine crankshaft 43 to the clutch driven shaft 45. Counter-clockwise rotation of the pedal 37 releases the clutch.

There is provided a power-operated device to release the clutch and this power-operated device is rendered active incidental to the clockwise or release movement of the accelerator pedal 31. When the operator allows the accelerator pedal to swing up under the influence of spring 33, he not only cuts off the flow of explosive mixture but incidentally thereto he renders active the clutch-releasing power device. 47 is a power cylinder having a cover 49 with an air opening 51. A diaphragm 53 is clamped between the cylinder and the cover and carries a rod 55 jointed to a rod 57 which latter rod has a sliding connection with the end of a lever 59 carried by the pedal pivot shaft 39. By the provision of nuts 61 at the end of rod 57 a movement of the diaphragm 53 to the left from the position shown in Fig. 1 pulls upon the lever 59 and releases the clutch just as it may be released by depression of the clutch pedal 37. A spring 63 is shown operable to return the lever 59 to its initial position. This connection between rod 57 and lever 59 permits the operation of the clutch by the pedal 37 without producing any movement of the elements concerned with the power operation of the clutch.

The movement of the diaphragm to the left is produced by a pressure differential on the two sides of the diaphragm. Pressure on the right side is always atmospheric, owing to the opening 51. Provision is made to reduce the pressure on the left side of the diaphragm. A conduit 65 is connected to the manifold 13 and to one end of a valve member 67. The other end of the valve member has slidable therein a piston 69. To this piston is connected a rod 71 terminating in a valve 73 having opposite seats 75 and 77. A spring 79 tends to move the valve 73 to a position away from its seat 77. A pipe 81 connects the chamber in the power cylinder at the left of the diaphragm to the region of the valve member adjacent the valve and between the seats, so that the space in the power cylinder to the left of the diaphragm may be put into communication with the suction pipe 65 when the valve 73 is moved from its seat 77. When the valve 73 is on its seat 77, the pipe 81 connecting the power unit with the valve member 67 cooperates with a pipe 83, and communication is afforded with a control member 85 having an atmospheric opening 87.

A connection is provided between lever 15 and the piston 69 whereby the depression of the accelerator pedal 31 may not only rock lever 15 but also may move the valve 73 to its seat 77 to the end that the left side of the power unit may be vented through passages 81, 67, 83, and 87. With the parts in this position the clutch will be engaged by the springs usually provided for the purpose.

Since there must be provided a further throttle opening movement after the valve 73 is seated, the following structure is provided. A rod 89 is pivoted to the piston 69 and secured as by threading to the end of a spring housing 91. Slidable in the other end of the housing 91 is a head 93 on a rod 95 which is pivoted to an extension arm 97 of lever 15. A spring 99 within the cylinder 91 yieldingly permits movement of the throttle lever 15 after the valve 73 is seated as will be obvious.

While the accelerator pedal is in the dotted line position, the valve 73 will be drawn from its seat 77 and seated at 75 so that the engine suction is operable to pull the diaphragm 53 and release the clutch. The parts are so arranged that the first increment of movement of the pedal 31 downward from its dotted line position will move the valve 73 to its seat 77 without opening the throttle to any considerable extent, not enough to very greatly increase the rate of rotation of the engine shaft. This first increment of movement serves to vent the power cylinder and permit the clutch to engage. Thereafter and upon further movement of accelerator 31, relative movement occurs between head 93 and cylinder 91 and the throttle continues to open.

If the operator now wishes to make a gear change or for any other reason wishes to release the clutch, as for coasting, he may remove his foot from the pedal 31 and the valve 73 shifts from seat 77 to seat 75 and the engine suction causes the clutch to be released. It may be that the operator will wish to use his engine for a brake, as on a steep hill. In that event he will relieve the pressure on the pedal 31 to an extent sufficient to partly cut off the supply of fuel, but not quite enough to reduce the engine to the idling speed it assumes when his foot is removed from the accelerator. This partial movement will be insufficient to move 73 from its seat 77 and the clutch will remain engaged so that the engine may be used as a brake. With complete removal of the foot the engine assumes idling speed and the clutch is released.

With a construction as above described, the operation may be somewhat unsatisfactory in one respect. If the operator releases the accelerator 31 the engine shaft 43 quickly comes to its idling speed while the momentum of the car prevents the shaft 45 from correspondingly reducing its rate of rotation. It may be that the operator will wish to increase the speed of the car before the rate of rotation of the two shafts has become synchronized. In his effort to increase the speed of the car he again depresses the pedal 31 which opens the throttle and vents the power cylinder through opening 87 as has been explained. This action would be attended by a prompt reengagement of the clutch. If such reengagement occurs while the shaft 45 is rotating faster than shaft 43, the engine momentarily checks the car speed by acting as a brake, an operation which the operator does not wish. This invention provides means to prevent the clutch reengagement under such circumstances until the shaft 43 under the influence of the opening throttle attains the speed of shaft 45. A flexible shaft 101 within a flexible shaft housing 103 takes its drive from a gear 105 in the gear housing 29. This gear 105 is rotated by one of the gears of the constant mesh train. It is therefore driven in timed relation to shaft 45. Another flexible shaft 107 is driven by gearing 109 associated with the crankshaft 43. A double pump 111 has pump or blower mechanism 113 driven by flexible shaft 107 at one end, and pump or blower mechanism 115 driven by shaft 101 at the other end. Air is drawn in from the atmosphere by pump 115 into the space between the two pumps and discharged by pump 113 at the other end of the double pump element. From the space between the pumps a pipe 117 connects with the interior of a bellows 119, secured at one end to the bottom of a cup 121. The other end of the bellows is connected to the bottom of a telescoping cup 123. A rod 125 connects the bottom of cup 123 by a pivot to a piston 127 slidable in the control member 85. The piston may slide to open or close the opening 87 to the air. A spring 129 is seated against the end of the control member 85 and also engages the bottom of cup 123. This spring operates to bias the cup 123 to a position corresponding to a location of piston 127 removed from the vent 87. This mechanism has no influence upon the operation of the clutch release mechanism except as follows.

If the shaft 45 is rotating faster than shaft 43 so that the engagement of the clutch would tend to render the engine active as a brake, pump 115 is delivering air to the space between the pumps faster than the pump 113 can relieve this pressure. The built-up pressure between the pumps is operable through pipe 117 and the bellows 119 to push the piston 127 over the vent 87, so that the air cannot escape from the power unit and permit the clutch to come into engagement. When the shaft 45 slows down or when the opening throttle increases the rate of rotation of shaft 43 so that the two shafts rotate at the same speed, the internal pressure between the pumps is relieved and the piston 127 withdraws from opening 87 influenced in doing so by spring 129. Clutch engagement then occurs. With this arrangement the vehicle coasts when the accelerator is released since the clutch is also released by the action of the power unit. When the accelerator is again depressed, the clutch will not be immediately engaged. It will not engage until the rotation of shaft 43 is equal to that of shaft 45. The objectionable retardation referred to above is therefore avoided.

Figure 2:
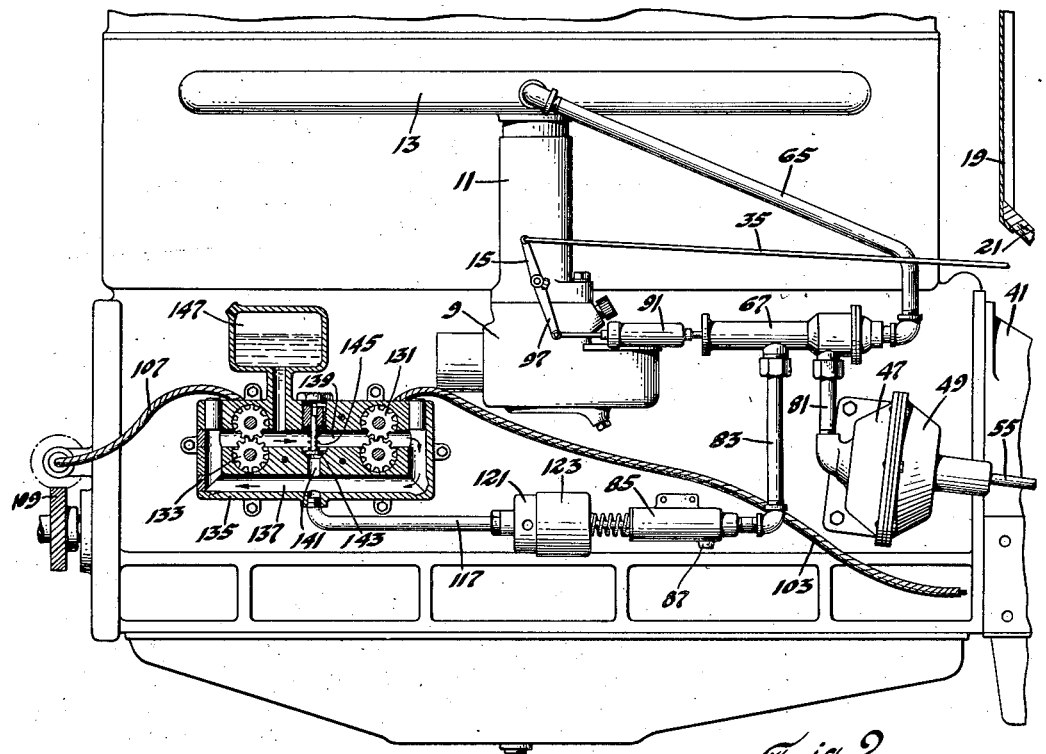
Fig. 2 is a similar view of a modified form.

On Fig. 2 is shown a similar control employing a liquid pump control mechanism instead of a control effected by air pumps. In this figure the several parts are the same as in Fig. 1 with the exception of the pump control device. The flexible cable 103 from the clutch shaft operates a liquid gear pump 131, and the cable 107 from the crankshaft operates a gear pump 133. The two pumps are located in a housing 135 having a passage 137 from the outlet of pump 131 to the inlet of pump 133. The passage 139 connects the outlet of pump 133 with the inlet to pump 131. A cross passage 141, between the passages 137 and 139, is controlled by a valve 143 biased by a spring 145 to close the passage and prevent a flow from passage 137 to passage 139, except under pressures in 137 sufficiently high to overcome the valve spring. The pipe 117 opens out from the passage 137 and communicates with the bellows enclosed within parts 121 and 123 as before. A reservoir 147 communicates with passage 139 and keeps the chamber passages filled with liquid. With this arrangement the double pump mechanism does not interfere with the operation of the clutch release and engagement except when the clutch shaft rotates at a speed above that of the engine shaft. Under this condition pressure is built up in passage 137 and this pressure acting through fluid within pipe 117 moves the piston 127 and closes the outlet 87 as before, thus preventing the venting of the power unit 47 and the reengagement of the clutch.

Fig. 3 shows still another arrangement by which a single pump may do the work of the double pumps of Fig. 1 and Fig. 2. In this figure the crankshaft 43' is formed with a pump chamber 151 within which is a rotating vane 153 formed as an extension on the end of clutch shaft 45'. The bearing between the ends of the shafts is designated by numeral 155. An inlet tube 157 is used to receive oil from the engine lubricating system, and an outlet 159 is connected by a pipe 161 which leads (like pipe 117 in Fig. 1) to the same control mechanism as is used in the forms of the invention shown by Figs. 1 and 2. With this third form of the invention, as long as no relative rotation occurs between the two shafts 43' and 45', no pumping action occurs. When, however, shaft 45' rotates faster than 43', fluid is pumped through outlet 159 and tube 161 to the same control mechanism as is illustrated in Fig. 1. Under the influence of such relative motion, the power cylinder is prevented from being vented to the atmosphere and the clutch is not able to reengage. As soon as the two shafts assume the same rate of rotation the pumping ceases and the clutch is permitted to reengage.

I claim:

1. In a motor vehicle, an engine having an engine shaft, a driving shaft, a clutch to couple said engine shaft and said driving shaft, power means to release said clutch and means dependent upon a difference in rates of rotation of said shafts to prevent clutch engagement together with engine control means and manually operable means to render active said power means for releasing the clutch and to simultaneously and successively operate said engine control means.

2. In a motor vehicle, an engine having an engine shaft, a driving shaft, a clutch to couple said engine shaft and said driving shaft, power means to release said clutch and means dependent upon a difference in rates of rotation of said shafts to prevent clutch engagement, said power means including a power cylinder and a movable valve to provide a connection between said cylinder and a source of suction in one position of the valve and with the atmosphere in a second position of said valve, and said means to prevent clutch engagement comprising a movable member dependent upon a variation of the rates of rotation of said shafts to prevent the venting of said power cylinder to the air.

3. In a motor vehicle, in combination, an internal combustion engine, a clutch for said engine, a clutch shaft, a differential device for producing a motion of a part, the direction of this motion being in one direction when the speed of the clutch shaft exceeds the engine speed, and in the reverse direction when the engine speed exceeds the clutch shaft speed, a power device arranged to disengage the clutch by overcoming the clutch spring, a control for the power device, a connection between the differential device and the power device which prevents clutch reengagement when the clutch shaft speed exceeds the engine speed.

4. In a motor vehicle, in combination, an internal combustion engine, a clutch for said engine, a clutch shaft, a fluid pump driven by the clutch shaft, a second fluid pump driven by the engine, a connection between the outlet of the first pump and the inlet of the second pump, a diaphragm acted upon by the pressure in the connection between the pumps, a power device arranged to disengage the clutch by overcoming the clutch spring, a control for the power device, a connection between the diaphragm and the control for the power device by which clutch reengagement is prevented when the clutch shaft speed exceeds the engine speed.

5. In a motor vehicle, in combination, an internal combustion engine having a crankshaft, a clutch for said engine, a clutch shaft, one element of a fluid pump fixed to the crankshaft, a relatively movable element of the pump connected to the clutch shaft, means to supply fluid to the pump, a device hydraulically connected to the pump which device has an element moving under fluid pressure, a power device arranged to disengage the clutch by overcoming the clutch spring, a control for the power device, a connection between the control and the power device by which clutch reengagement is prevented when the clutch shaft speed exceeds the engine speed.

6. In a motor vehicle, in combination, an internal combustion engine having an intake manifold in which is located a throttle, a clutch for said engine, a clutch shaft, a differential device for producing a limited motion of a part, the direction of this motion being in one direction when the engine speed exceeds the clutch shaft speed and in the reverse direction when the clutch shaft speed exceeds the engine speed, a diaphragm forming a wall of a closed chamber, a connection between the closed chamber and a valve casing, a connection between the valve casing and the intake manifold, a control valve in the valve casing arranged to open or close the connection between the chamber and the intake manifold, a connection from the closed chamber to a second valve casing, said second valve casing having an opening to atmosphere, a valve in the second casing connected to the moving part of the differential device whereby air is admitted to the second valve casing and the closed chamber when the engine speed is equal to or greater than the clutch shaft speed, but is excluded when the clutch shaft speed is greater than the engine speed.

7. In a motor vehicle, an engine having a shaft, a driving shaft, a clutch to couple said shafts, yielding means to effect clutch engagement, power means to release said clutch, mechanism to render said power means operable or inoperable, control means for said mechanism and other means responsive to a difference in rates of rotation of said shafts and operable upon said mechanism, irrespective of the action of said control means to prevent clutch reengagement after release.

8. In a motor vehicle, an engine having a shaft, a driving shaft, a clutch to couple said shafts, power means to release said clutch, mechanism to render said power means operable or inoperable, control means for said mechanism and other means responsive to a difference in rates of rotation of said shafts and operable upon said mechanism, irrespective of the action of said control means to prevent clutch reengagement after release, said other means comprising a plurality of pumps, one driven by the engine shaft, the other by the driving shaft, conduit means between said pumps and movable means controlled by pressure in said conduit and operable upon said mechanism.

9. In a motor vehicle, an engine having an engine shaft, a driving shaft, a clutch to couple said engine shaft and said driving shaft, yielding means to bias said clutch to engaged position, power means to release said clutch and rotatable means actuated by a difference in rates of rotation of said shafts to prevent clutch engagement.

JOHN H. HUNT.